United States Patent [19]

Schumacher

[11] 3,995,269

[45] Nov. 30, 1976

[54] ALIGNMENT OF A VIDEO DISPLAY SYSTEM HAVING MULTIPLE INPUTS

[75] Inventor: Arnold Schumacher, Amherst, N.H.

[73] Assignee: Sanders Associates, Inc., Nashua, N.H.

[22] Filed: Nov. 29, 1974

[21] Appl. No.: 528,245

[52] U.S. Cl. ............................. 343/5 EM; 315/377; 340/324 A
[51] Int. Cl.² ....................... G01S 7/22; G08B 23/00
[58] Field of Search ................. 343/5 EM; 315/377; 340/324 A

[56] References Cited
UNITED STATES PATENTS

| | | | |
|---|---|---|---|
| 3,324,471 | 6/1967 | Rover, Jr. | 343/5 EM |
| 3,337,860 | 8/1967 | O'Hara, Jr. | 340/324 A |
| 3,440,638 | 4/1969 | Van Valkenburg | 343/5 EM |
| 3,543,269 | 11/1970 | Dudley | 343/5 EM |
| 3,648,283 | 3/1972 | Busch et al. | 343/5 EM |
| 3,753,032 | 8/1973 | Naidich et al. | 315/377 |
| 3,896,432 | 7/1975 | Young | 343/5 LS |

Primary Examiner—Richard A. Farley
Assistant Examiner—S. C. Buczinski
Attorney, Agent, or Firm—Louis Etlinger; Joseph E. Funk

[57] ABSTRACT

Alignment apparatus is disclosed for use in a radar display system in which targets are displayed on a raster scanned cathode ray tube and a computer causes target identities to be displayed adjacent to each target. To align the display system the computer generates a first signal which is applied to the system in the same manner as are radar video signals, and generate a second signal which is applied to the system in the same manner as are target identity signals. The two signals cause two dot test patterns to be displayed on the tube and interactive display techniques including a positional entry device such as a light pen are used to cause the two test patterns to be superposed. In response to superposition of each dots of the test patterns, the computer generates and stores correction signals which are thereafter used to modify the target identity signals to assure that target identities are displayed in proper registration with the targets.

3 Claims, 3 Drawing Figures

ALIGNMENT OF A VIDEO DISPLAY SYSTEM HAVING MULTIPLE INPUTS

FIELD OF THE INVENTION

This invention relates to video display systems and particularly to the presentation of information at selected positions on the face of a display device. More particularly the invention relates to the alignment of a display system having a plurality of display signal inputs.

BACKGROUND OF THE INVENTION

In the prior art it has often been necessary to provide a visual display using signals obtained from a plurality of sources and applied to a display device over a like plurality of circuit paths. In some applications two or more of these signals are applied to the display device at the same time, whereas in other applications two or more signals are applied to the display device at different times, but in either instance it is important that each of the resulting displays be in exact positional relationship to each other. One such application in which different displays must be in juxtaposition or superposition is in a radar display system.

A radar operator often observes multiple targets on the face of radially scanned cathode ray tube (CRT) called a plan position or display indicator. With multiple targets it is often difficult to remember the identity of each target displayed on the CRT, so it has proven desirable to display symbolic information on the CRT adjacent to the radar targets to identify the targets. The symbolic information is usually in alphanumeric and symbol form and provides the radar operator with the identity and sometimes other pertinent operational information concerning each target. Presentation of the symbolic information is accomplished by auxiliary means which receives target identification information from the radar operator or a computer and generates video signals for the display of the information.

In the radar display art it is well known to use a raster scanned CRT for display indication rather than a radial scanned CRT display. Raster scanned displays have provided a bright display upon which it is relatively easy to observe targets and symbolic information. In one radar system utilizing a raster scanned CRT the radar target video display is applied to the display indicator via a first path including the radar equipment and a scan converter which converts the conventional radial scan radar display for raster scan display. The symbolic information is computer generated and is applied to the radar display indicator via a second path.

There are several sources of error in each of the two signal paths to the radar display indicator screen which can cause the symbolic information not to be displayed on the radar screen adjacent to the associated radar targets. In the event that multiple targets are displayed near each other on the radar screen, misregistration of symbolic information and targets on the screen can result in misidentity of targets with possible dangerous consequences. Some sources of error causing misregistration include nonlinearities in amplifiers and the scan converter deflection systems as well as many other inherent faults well known in the art. It has been possible in the prior art to minimize the registration error by providing complex equipment and by requiring difficult alignment procedures, but both these approaches have been found to be prohibitively costly and time consuming.

Accordingly, there is a need in the art for apparatus to simply and accurately align a display system having multiple signals input thereto for multiple displays that must be in exact positional relationship to each other.

SUMMARY OF THE INVENTION

In accordance with the teaching of my invention I fill the aforementioned need in the prior art. In the radar system embodiment of my invention disclosed and claimed herein, I provide novel means for quickly and easily aligning a radar display system to assure that target identity information is accurately positioned adjacent to target information on the radar screen. My novel means functions in an alignment mode to apply a first video test signal to the radar system in the same manner as target information is normally applied to the radar system. The alignment means also functions to apply a second video test signal to the radar system in the same manner as target identity information is normally applied to the radar system. The first and second video test signals cause two test patterns to be displayed that should be superposed on the radar screen but, due to many sources of errors that are well known in the art and briefly mentioned heretofore, the two test patterns are not superposed. I then employ other means to superpose the two video test patterns on the radar screen. The superposing means causes correction signals to be generated that are stored in the memory of a display processor functioning with the radar display system. Thereafter, as the display processor generates display signals for the target identity information, the processor utilizes the stored correction data to modify the target identity display signals to assure that the symbolic information is displayed adjacent to the target information.

More particularly, in the embodiment of my invention disclosed herein, radar target video signals are input to the "write" side of a scan converter in a manner well known in the art. A raster sweep generator causes the "read" side of the converter to be scanned in synchronization with the raster scan of a radar display indicator which the sweep generator also drives. The signals generated by scanning the "read" side of the converter are applied to the display indicator and cause the targets to be displayed thereon in odd and even interlaced fields which are well known in the television art. During the display indicator vertical retrace time between interlaced fields, the display processor controls a display generator unit to display the appropriate symbolic target identity information on the radar screen adjacent to each target.

The scan-converter receives and stores for a short period target location information while the display processor receives and stores target identity information in a memory. Target information is read out of the scan-converter and displayed on the radar screen during normal scanning of the screen in a manner well known in the art and described in the detailed description. The symbolic target identity information is read out of the memory and its time base is corrected using the information stored in the correction table. The corrected identity information is then applied to the display indicator during vertical retrace times to accurately write the appropriate symbolic information adjacent to each target on the radar screen.

To generate the correction table to be stored in the memory functioning with the display processor the radar system is placed in an alignment mode wherein the display processor reads a first test signal out of the memory which is synchronized with a write sweep generator that radially scans the write side of the scan converter. This first test signal is applied via the display generator unit to the write side of the scan converter to form a dot test pattern. This dot test pattern is then read out of the read side of the converter and displayed on the raster scanned radar screen in the same manner as briefly described heretofore for targets.

During vertical retrace time of the radar screen the display processor reads a second test signal out of memory that is applied via the display generator unit to the radar screen to display the same dot test pattern. The two dot test patterns displayed on the radar screen usually will not be superposed on the radar screen for the reasons described briefly heretofore. In this embodiment of the invention interactive display techniques including a positional entry device such as are used to move each dot displayed on the screen in the same manner as the symbolic information to superpose both dot test patterns. Correction information generated by moving each of the test pattern dots with the light pen is then stored by the processor in the correction table in the memory. The processor thereafter utilizes the information stored in the correction table to derive display position correction information for the target identity information associated with each target. As most symbolic information is positioned on the radar screen between locations where dots of the test pattern were located, the display processor utilizes an interpolation algorithm to interpolate appropriate correction information from information stored in the correction table. In this manner symbolic target identity information can be placed accurately in registration with target information to eliminate radar operator errors in correlating symbolic information with target information when multiple targets are present on the radar screen in close proximity to each other.

DESCRIPTION OF THE DRAWINGS

The nature of my invention and its various advantages will appear more fully upon consideration of the detailed description which is found hereinafter and the drawing in which.

Detailed Description

Before describing my novel radar display alignment apparatus in detail, I briefly describe the operation of conventional radar equipment in order to more easily understand how my apparatus functions therewith. The details of such radar equipment are not shown in FIG. 1 but enough is shown to thoroughly understand my invention.

In radar equipment a transmitting-receiving antenna (not shown) is rotated by a motor (not shown). A pulsed radar transmitter (not shown) and a radar receiver 10 are alternately connected to the antenna via a transmitter-receiver switch (not shown) in order to transmit radar pulses and then receive same and display targets in a manner well known in the art. The position of the antenna is sensed by a variety of well known means including a synchro generator. Such a combination, for example, is provided in antenna position unit 11.

To identify a target on a radar screen, a variety of manually operated or automatic equipment is utilized including conventional transponder-responder equipment in commercial and friendly military aircraft to operate and return a target identity signal to a receiver associated with the radar equipment. The identity signal, or an arbitrary identification signal caused to be generated by the radar operator in a well known manner for aircraft not equipped to provide identification signals, are utilized by a computer for displaying target identities on the radar screen adjacent to appropriate targets. In this embodiment of the invention target identification signals are automatically obtained and are provided by target identification unit 12.

Figure 1:
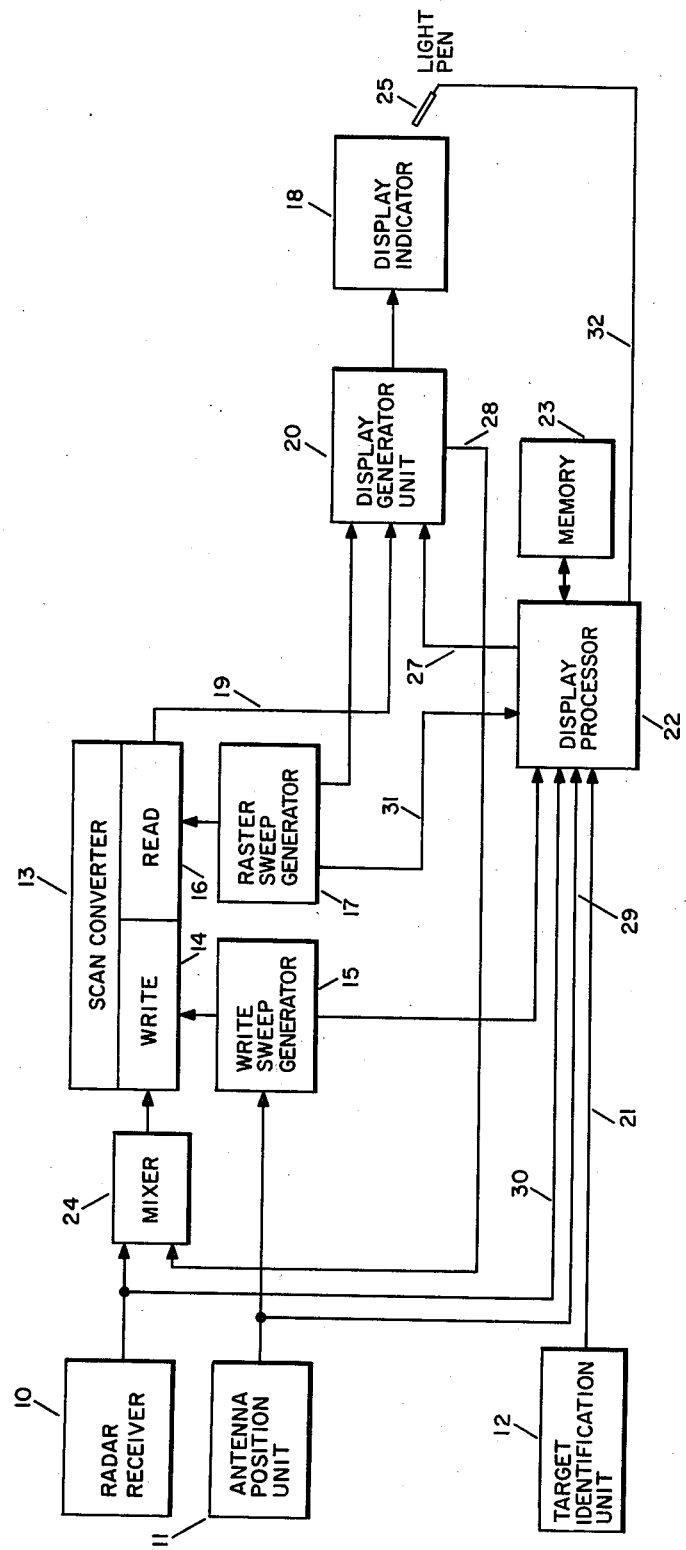
FIG. 1 is a functional block diagram of a raster type display radar system illustrating my invention.

Turning now to describe the radar target display system shown in FIG. 1 with which the preferred embodiment of my invention functions.

In contrast to presenting a radar display on a conventional radially swept plan position indicator (PPI), it is known that converting such a display to a television type display offers definite advantages such as brighter displays. Also, symbolic target identification information is more easily displayed. To provide such a television display in this embodiment of my invention a scan-converter 13 is utilized that is well known in the art. Briefly, one scan-converter type utilizes a bombardment-induced conductivity tube (not shown) which is fully described by D. L. Plaistow in "An Experimental Scan Conversion System for the Production of Bright Radar Displays" Marconi Review, 23 No. 139 pp. 184–203, 1960. The tube contains two electron guns (not shown) mounted opposite each other with an insulating sheet between them. One of the guns, the write gun, located in the write side 14 of converter 13, causes the insulating sheet to become electrically charged with a charge distribution corresponding to the manner in which the write gun is caused to write on the sheet by write sweep generator 15 and by the radar video signals obtained from receiver 10 via mixer 24. The other gun is the read gun and is located in the read side 16 of converter 13. The read gun scans the sheet in a television raster scan format under the control of raster sweep generator 17 to read the charge on the sheet and thereby produces variable signals corresponding to the information written on the sheet. These variable signals are transmitted via lead 19 to display generator unit 20 which causes the targets to be displayed on display indicator 18 in a raster scan format.

At the same time as radar video signals are being received and displayed on display indicator 18 as just described, a target identity signal is received by target identification unit 12 from aircraft equipped with transponder-responder equipment in a manner well known in the art.

In a manner well known in the art identification signals received by identification unit 12 are applied via lead 21 to display processor 22 which stores them in memory 23 along with antenna position information received over lead 29 from antenna position unit 11 and target range information received over lead 30 from receiver 10. As a particular or target moves and the antenna position and target range information change, processor 22 updates the information stored in memory 23. At the end of raster scan of an odd or even interlaced scan field when raster sweep generator 17 generates vertical sync pulses, generator 17 sends a write pulse over lead 31 to processor 22. In response to the write pulse processor 22 reads out all identity signals along with the associated antenna position and target range information and generates target identity display signals which are forwarded via lead 27 to display generator unit 20. Display generator 20 processes the display signals into video signals that are applied to display indicator 18 during the approximately 1200 microsecond vertical retrace time to display the appropriate symbolic information adjacent to each target in a point-to-point display fashion.

Figure 2:
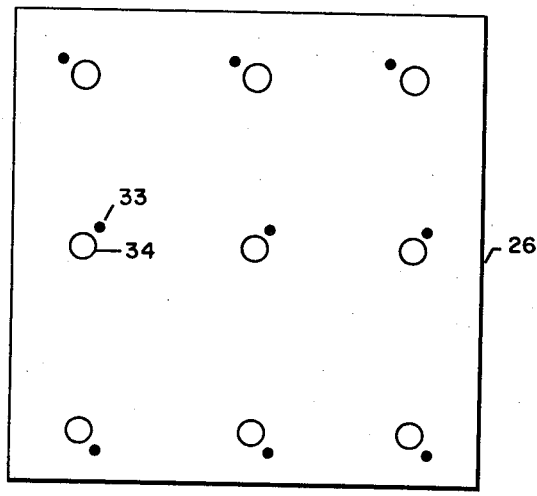
FIG. 2 is a representation of the radar screen with the two dot test patterns thereon before alignment of the display system.

In the alignment mode of operation, in accordance with the teaching of my invention, display processor 22 reads out a first test signal stored in memory 23 to display a first dot test pattern during the odd and even interlaced scan fields of monitor 18. The first test signal is output on lead 27 to be processed by display generator 20 into video signals that are displayed on display indicator 18, the same as the symbolic information is generated and displayed. The dot test pattern is displayed as rows and column of equispaced circles 34 shown on radar screen 26 of FIG. 2. In FIG. 2 the first dot test pattern is portrayed on radar screen 26 as small circles 34 only for ease in distinguishing the two dot test patterns as is apparent.

In response to write pulses on lead 31 from raster sweep generator 17, processor 22 reads out a second test signal from memory 23 during each vertical retrace period. This second test signal is output on lead 27 and processed by display generator 20 into video signals that are in turn output on lead 28 to be applied via mixer 24 to the write side 14 of scan converter 13. The last mentioned video signals causes another dot test pattern to be written on the write side 14 of the scan-converter 13 sheet (not shown) as write sweep generator 15 radially scans the sheet. The other dot test pattern is shown as dots 33 on radar screen 26 of FIG. 2.

Figure 3:
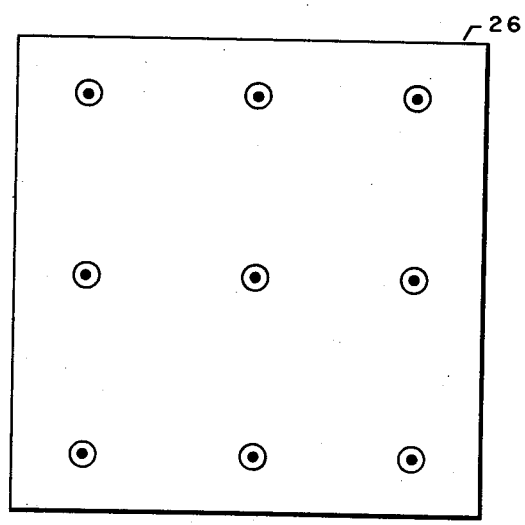
FIG. 3 is representation of the radar screen with the two dot test patterns thereon after alignment of the display system.

Theoretically, the second test pattern of dots 33 should be superposed on the first test pattern of circles 34 as shown in FIG. 3, but due to the previously described nonlinearities and errors in the radar display system the two test patterns are not superposed as shown in FIG. 2.

To align the radar display system so that the symbolic information is displayed adjacent to targets, the radar operator or maintenance personnel utilize light pen 25 to move each dot 33 on screen 26 of FIG. 2 to be superposed with each corresponding circle 34 in a manner well known in the interactive graphic display terminal art. As each dot is moved into superposition with its corresponding circle, a button (not shown) is operated that causes the processor to generate correction information and store the information in an assigned area in memory 23. In this manner a correction table is assembled in memory 23 which is accessed by processor 22 in normally generating symbolic information signals for each target. Processor 22 utilizes an interpolation algorithm that reads out the correction information stored in memory 23 for the four test pattern alignment points closest to a target displayed on indicator 18. An interpolation is made utilizing the algorithm and the processor accordingly corrects positional information for each target identity signal to assure that symbolic target identity information is displayed in proper registration with targets on screen 26 of indicator 18.

It is to be understood that the above described embodiment of my invention is only illustrative thereof and it will be obvious to those skilled in the art that various changes and modifications may be made therein without departing from the scope of the invention. It is the object of the appended claims to cover all such changes and modifications as fall within the true spirit and scope of the invention.

For example, different signals such as the target and symbolic information signals need not be displayed in different time periods as disclosed herein. The signals may be generated concurrently and mixed to be displayed at the same time. In another variation three or more signals may be input to a display system over different paths for concurrent or sequential display. In still another variation, multiple input signals to the display system may all be in one format and only one alignment test signal need be generated to align the displays corresponding to the different input signals. In yet another variation, other instruments such as a joystick, track ball, data tablet, keyboard keys or other positional entry devices known in the art may be used to superpose alignment test patterns rather than the light pen disclosed herein; or a programmed alignment arrangement may be utilized wherein the test patterns are automatically aligned.

Thus, it may be seen from the above that many changes and modifications may be made to the invention without deviating from the true spirit and scope of the invention.

What is claimed is:

1. A method for aligning an interactive video display system equipped with a positional entry device and wherein said display system has first and second display signals input thereto via a first and a second circuit path respectively to provide a composite display on a display device of said system, comprising the steps of applying a first alignment signal to said first circuit path to display a first test pattern on said display device, applying a second alignment signal to said second circuit path to display a second test pattern on said display device, utilizing said positional entry device with said display system in an interactive mode to superimpose a plurality of discrete points of said first test pattern on a like plurality of discrete points of said second test pattern on said display device and thereby generate correction signals, storing said correction signals in a memory, and modifying said first display signals being input to said first circuit path, to change the position of a first information display on said display device by an amount indicated by an interpolation performed by said computer between the correction signals stored in said memory for the discrete points of said first test pattern among which said first information display is located to assure that said first information display is in proper registration with a second information display on said display device.

2. The method of aligning an interactive display system in accordance with claim 1 further comprising the steps of generating said first alignment signal in response to a test signal stored in said memory, generating said second alignment signal in response to said test signal stored in said memory, said first information display being in exact registration with said second information display on said display device if said first and said second alignment signals are both applied to said first or to said second circuit path, but not being in exact registration with each other when applied to said first and to said second circuit paths respectively prior to modifying said first display signals due to electrical differences between said paths.

3. A method for aligning a radar system wherein radar return signals are input via a first circuit path to a positional entry device equipped interactive radar display indicator functioning with a computer and a memory to display targets, and target identification apparatus identifies targets and generates identification signals which are applied via a second circuit path to a display generator which generates video signals that are input to said display indicator to display appropriate identification symbols on said indicator adjacent to the appropriate target traces, comprising the steps of applying a first alignment signal to said first circuit path to display a first test pattern on said display indicator, applying a second alignment signal via said second circuit path to said display generator to display a second test pattern on said display indicator concurrently with the display of said first test pattern, using said positional entry device in an interactive mode of operation to superimpose a multiplicity of specific points of said first test pattern on said second test pattern on said display indicator, and thereby generate correction signals, storing said correction signals in a memory, modifying said identification signals generated by said target identification apparatus by an amount indicated by an interpolation performed by said computer between the stored correction signals for the ones of said specific points on said display indicator among which the target trace corresponding to the identification signal being modified by said computer is located to assure that each identification symbol is displayed immediately adjacent to the appropriate target trace.

* * * * *